United States Patent [19]

Roberts et al.

[11] Patent Number: 5,037,176
[45] Date of Patent: Aug. 6, 1991

[54] OPTICAL SWITCH WITH REDUCED REFLECTION

[75] Inventors: Harold A. Roberts, Eden Prairie; Robert A. Eno, Plymouth; Calvin G. Nelson, Shorewood; David J. Emmons, Richfield; Liang-Ju Lu, Richfield; Robert Ziebol, Blaine, all of Minn.

[73] Assignee: ADC Telecommunications, Inc., Minneapolis, Minn.

[21] Appl. No.: 467,748

[22] Filed: Jan. 19, 1990

[51] Int. Cl.⁵ ............................................. G02B 6/36
[52] U.S. Cl. ..................................................... 385/16
[58] Field of Search .................. 350/96.2, 96.21, 96.22, 350/96.23

[56] References Cited

U.S. PATENT DOCUMENTS

| | | | |
|---|---|---|---|
| 3,416,089 | 12/1968 | Koester et al. | 350/96.2 |
| 3,421,097 | 1/1969 | Koester et al. | 350/96.2 |
| 3,445,785 | 5/1969 | Koester et al. | 350/96.2 |
| 3,910,677 | 10/1975 | Becker et al. | 350/96.2 |
| 3,949,315 | 4/1976 | Zeidler | 330/4.3 |
| 3,970,360 | 7/1976 | Kersten et al. | 350/96.2 |
| 4,314,740 | 2/1982 | Bickel | 350/96.15 |
| 4,384,431 | 5/1983 | Jackson | 51/34 |
| 4,401,365 | 8/1983 | Mizokawa et al. | 350/96.2 |
| 4,423,922 | 1/1984 | Porter | 350/96.15 |
| 4,538,383 | 9/1985 | Le Marer et al. | 51/124 |
| 4,573,760 | 3/1986 | Fan et al. | 350/96.21 |
| 4,615,581 | 10/1986 | Morimoto | 350/96.21 |
| 4,652,082 | 3/1987 | Warner | 350/96.2 |
| 4,674,831 | 6/1987 | Bagby | 350/96.2 |
| 4,695,126 | 9/1987 | Cook | 350/96.21 |
| 4,766,705 | 8/1988 | Dholakia | 51/328 |
| 4,850,148 | 7/1989 | Takatsu | 51/73 |
| 4,946,247 | 8/1990 | Muska et al. | 350/96.2 |

FOREIGN PATENT DOCUMENTS

| | | | |
|---|---|---|---|
| 56-111814 | 9/1981 | Japan | 350/96.13 |
| 63-208812 | 8/1988 | Japan | 350/96.21 |

OTHER PUBLICATIONS

Abstract of a Presentation by V. Shah, L. Curtis and W. C. Young at a 1989 OFC Conference.
Reproduction of vol. 22 of the Electronics Letters 1986, pp. 731-732.

Primary Examiner—John D. Lee
Assistant Examiner—Phan T. Heartney
Attorney, Agent, or Firm—Merchant, Gould, Smith, Edell, Welter & Schmidt

[57] ABSTRACT

An optical switch is disclosed including a first and second array of optical fibers held in axial alignment and relatively rotatable about an axis of rotation to effect optical coupling and decoupling of fibers of the opposing arrays. Terminal ends of fibers of the first array are set at a predetermined non-orthogonal angle relative to the axis of rotation. Terminal ends of fibers of the second array are set at an angle which is complementary to the non-orthogonal angle.

9 Claims, 4 Drawing Sheets

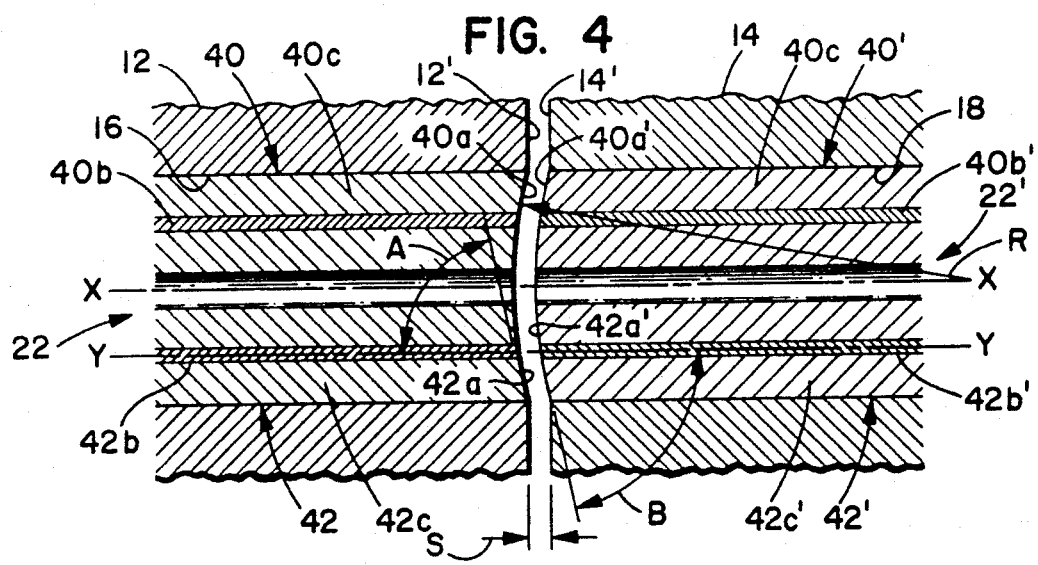
FIG. 4
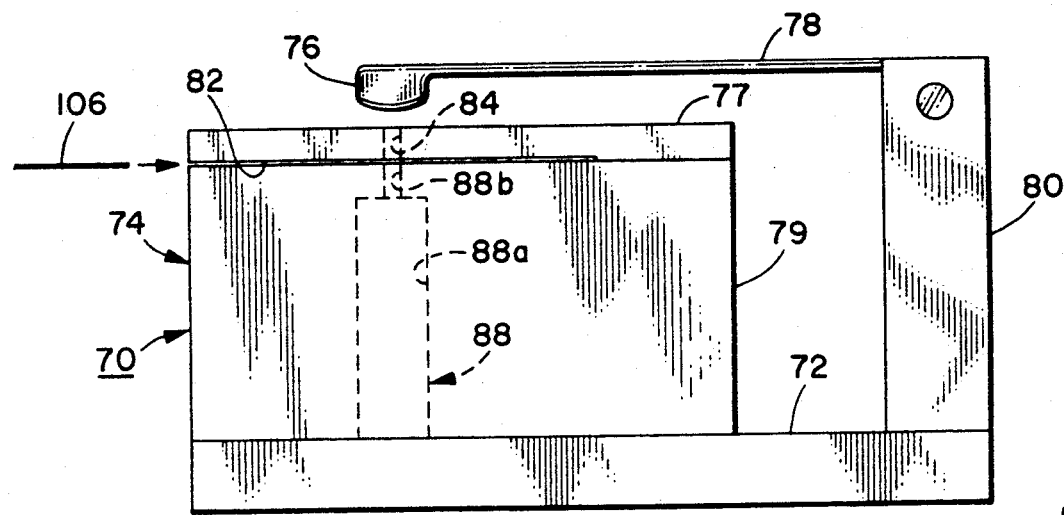
FIG. 5
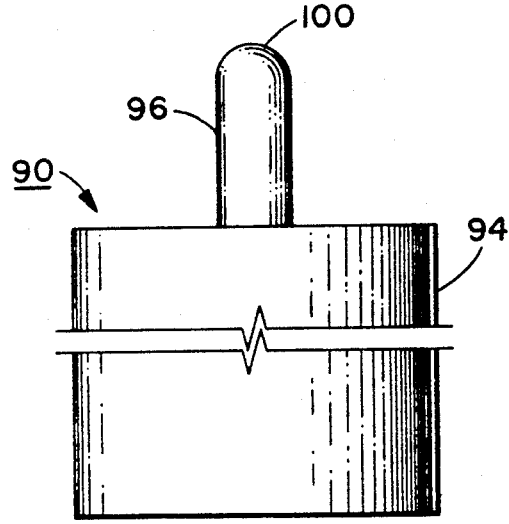
FIG. 6
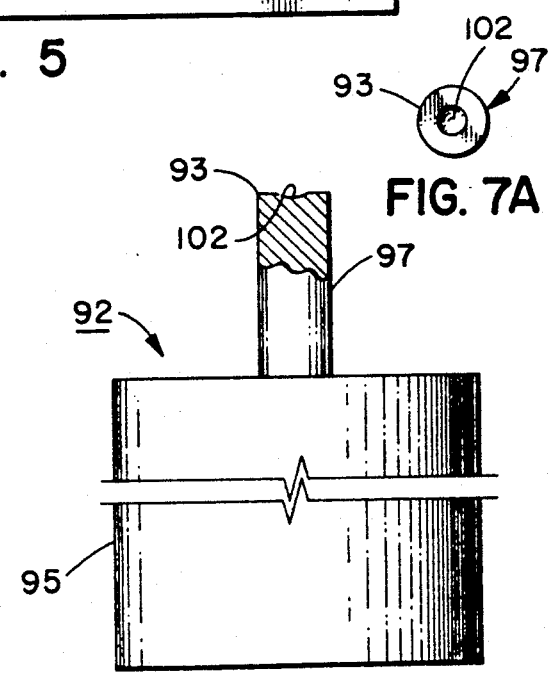
FIG. 7A
FIG. 7

OPTICAL SWITCH WITH REDUCED REFLECTION

CROSS-REFERENCE TO RELATED APPLICATION

Commonly assigned U.S. patent application Ser. No. 07/467,803, filed concurrently herewith and entitled "Method for Constructing Optical Switch" teaches and claims a method of constructing a switch according to the present invention.

BACKGROUND OF THE INVENTION

1. Field of the Invention

This invention pertains to optical fiber switches for switching optical transmission paths. More particularly, this invention pertains to an optical switch having reduced back reflection.

2. Description of the Prior Art

Commonly assigned and copending U.S. patent application Ser. No. 300,205, filed Jan. 19, 1989 (a continuation-in-part of U.S patent application Ser. No. 191,014, filed May 6, 1989 now abandonment), teaches an optical switch. The switch is intended for use in the telecommunications industry for switching optical fibers that carry signal transmissions. The switch of the aforesaid patent application includes first and second pluralities of optical fibers bundled in first and second arrays. The two arrays are disposed facing one another, and rotatable about a common axis of rotation. By rotating one fiber array relative to the other fiber array, fibers of the opposing arrays may be selectively coupled or decoupled to provide switching.

In any optical fiber transmission system, it is desirable to design and construct the system to reduce or eliminate back reflection. Back reflection refers to the phenomenon where the signal-carrying light is partially reflected from the terminal end of an optical fiber back into the fiber. Back reflection commonly arises where the terminal end of the optical fiber is flat and orthogonal to the axis of the fiber and there is a refractive index discontinuity. With this geometry, a portion of the light passes through the terminal end. However, a noninsignificant insignificant portion of the light is reflected back into the fiber.

Recognizing the undesirable consequences resulting from back reflection, developers of optical transmission systems are commonly specifying limitations on the amount of back reflection which will be tolerated by optical fiber transmission equipment, such as optical switches. For example, common specifications may require that optical switches have less than about $-40$ dB back reflection.

It is an object of the present invention to improve upon prior optical switch design to reduce the back reflection associated with the switch.

SUMMARY OF THE INVENTION

According to a preferred embodiment of the present invention, an optical switch is provided comprising a first and second plurality of optical fibers. The first and second plurality of fibers are held in first and second arrays, respectively. Means are provided for aligning the first and second arrays to rotate relative to one another about a common axis of rotation.

The first and second arrays are selected for at least one fiber of each array to be disposed with its axis spaced from and generally parallel to the axis of rotation. The terminal ends of the fibers of each array are disposed for opposing fibers to be optically coupled or decoupled in response to relative rotation between the first and second arrays. The terminal ends of the fibers of the first array are set at a predetermined non-orthogonal angle relative to the axis of rotation. The terminal ends of the fibers of the second array are shaped with a tangent at the fiber core set at an angle which is complementary to the predetermined angle of the fibers of the first array.

BRIEF DESCRIPTION OF THE DRAWINGS

FIG. 4 is an enlarged view of opposing fiber arrays of a switch of the present invention;

FIG. 5 is a side elevation view of a jig for use in polishing fibers of the switch of the present invention;

FIG. 6 is a side elevation view of a first die for use with the jig of FIG. 5;

FIG. 7 is a side elevation view, partially in section, of a second die for use with the jig of FIG. 5;

FIG. 7A is a top plan view of the jig of FIG. 7;

DESCRIPTION OF THE PREFERRED EMBODIMENT

A. General Construction of Switch

Figure 1:
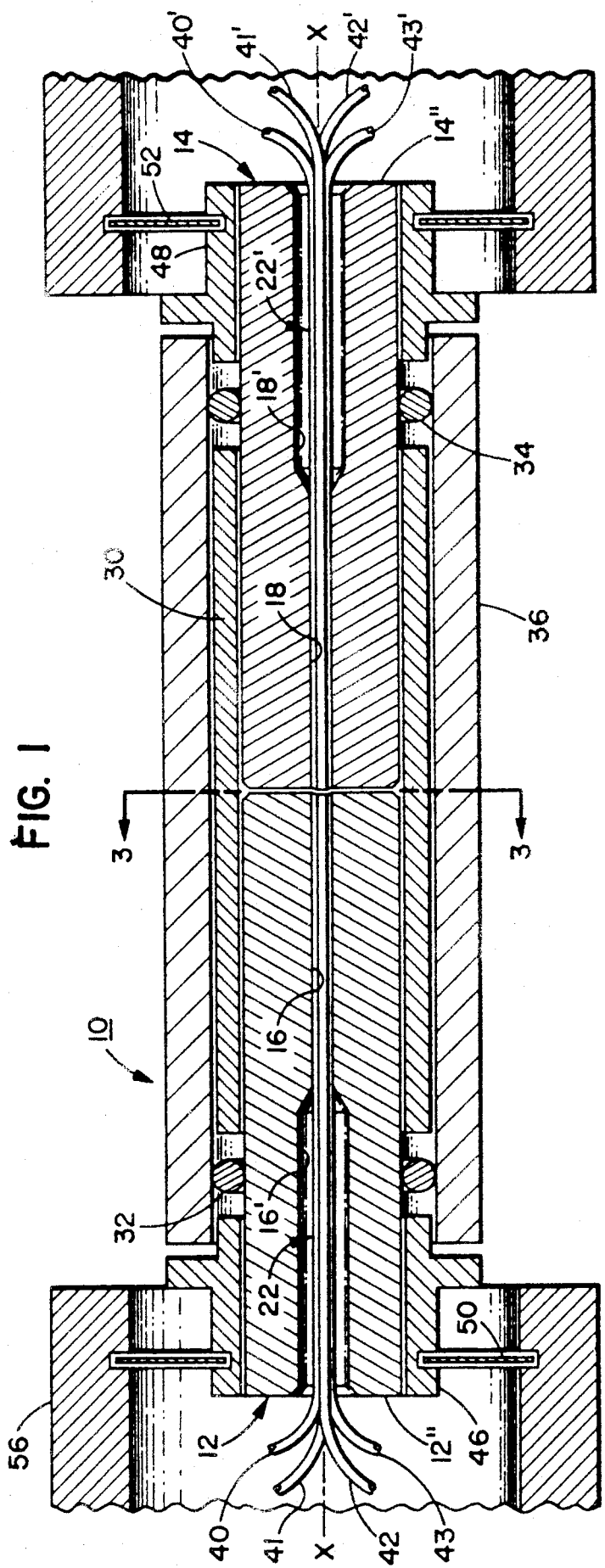
FIG. 1 is a cross-sectional side view of an optical switch incorporating the geometry and method of construction of the present invention.

Referring now to the several drawing figures in which identical elements are numbered identically throughout, a description of a preferred embodiment of the present invention will now be presented with reference to optical switch 10. Except for the geometry of the terminal ends of fiber arrays held within switch 10, optical switch 10 is identical to that shown and described in the aforementioned commonly assigned copending U.S. patent application Ser. No. 300,209, filed Jan. 19, 1989, as a continuation-in-part application of U.S. patent application Ser. No. 191,014, filed May 6, 1988 now abandonment, It will be appreciated that the description of the present invention with reference to an optical switch such as that shown in the aforementioned U.S. patent application Ser. No. 300,205 is done for the purpose of illustrating a preferred embodiment of the present invention. It is not intended to limit the present invention to the specific optical switch structure shown. Indeed, it is intended that the present invention could be utilized in a wide variety of optical fibers having rotary switching action.

Switch 10 includes a first switch body 12 and a second switch body 14. Each of switch bodies 12 and 14 is identical, and is provided in the form of a ceramic plug of generally cylindrical configuration. Extending axially through the bodies 12 and 14 are bores 16 and 18, respectively. Bodies 12 and 14 terminate at terminal axial faces 12' and 14', respectively (shown best in FIG. 4).

As shown in FIG. 1, bores 16 and 18 include enlarged portions 16', 18'. The smaller diameters of bores 16 and 18 are sized to receive, in close tolerance, arrays of optical fibers. Bore portions 16, and 18, are enlarged to facilitate admission of optical fibers into bores 16, 18.

Each of switch bodies 12, 14 are provided with first and second arrays 22, 22', respectively, of optical fibers. In the embodiment shown, each of the first and second arrays 22, 23 include four optical fibers. However, as noted in the aforesaid U.S. patent application Ser. No. 300,205, the number of optical fibers in an array may vary from a minimum of one fiber to any number of a plurality of fibers within an array.

With reference to FIGS. 1-4, the reader will note the first array 22 consists of four optical fibers 40, 41, 42, and 43. First array 22 is received within bore 16 of first switch body 12. A similar second array 22' of four optical fibers 40'-43' is shown within bore 18' of second switch body 14.

Each of arrays 22 and 22' are selected such that optical fibers 40-43 and 40'-43' are disposed closely-packed in side-by-side abutting relation.

Figure 3:
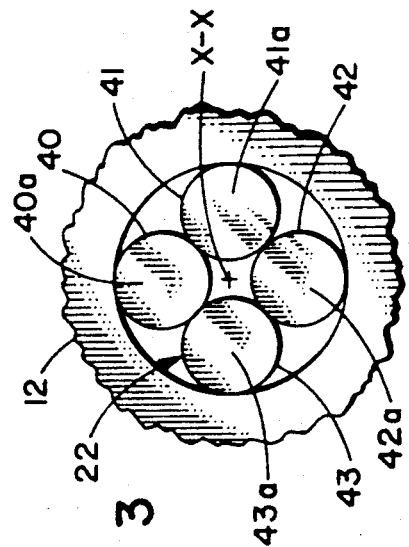
FIG. 3 is an end side view of a switch body holding an array of optical fibers taken along lines 3—3 of FIG. 1.
Figure 2:
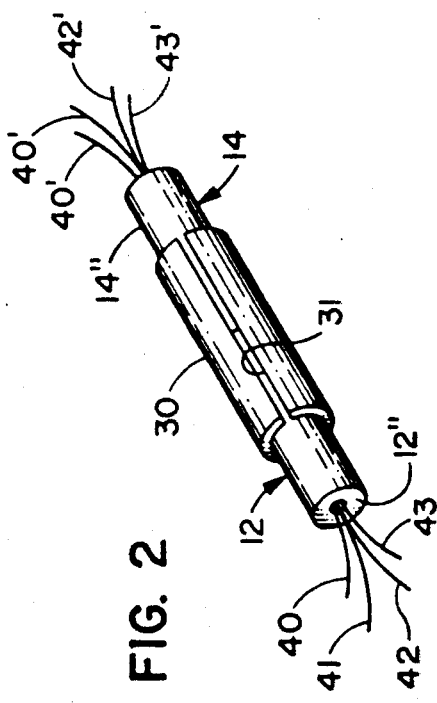
FIG. 2 is a perspective view of the switch of FIG. 1 showing switch bodies held by a split sleeve coupler.

Shown best in FIG. 3, the first array 22 (which is identical to second array 22') is disposed with the optical fibers 40-43 disposed circumferentially about rotational axis X—X.

The fibers 40-43 terminate at terminal ends 40a, 41a, 42a and 43a. Similarly, fibers 40'-43' terminate at terminal ends 40a'-43a, (see FIG. 4). As will be more fully described, the terminal ends 40a-43a and 40a'-43a' are non-orthogonal to the axis of the optical fibers and to the axis X—X of the switch bodies 12, 14.

The arrays 22, 23 within switch bodies 12 and 14, respectively, are maintained in coaxial alignment by means of a sleeve coupler 30. Shown in FIGS. 1 and 2, sleeve 30 surrounds the exterior surface of both switch bodies 12 and 14. Exterior ends 12" and 14" of switch bodies 12 and 14 extend axially away from sleeve 30. Sleeve 30 is preferably a ceramic split sleeve having an axially-extending gap 31 (see FIG. 2) disposed along the length of the sleeve 30.

With the switch bodies 12 and 14 disposed within sleeve 30, and with faces 12' and 14' opposing one another, the arrays 22, 22' are in coaxial alignment. Further, each of sleeves 12 and 14 is rotatable within sleeve 30 and axially slidable within sleeve 30.

A first O-ring 32 is provided surrounding switch body 12. O-ring 32 opposes sleeve 30. Similarly, a second O-ring 34 is provided surrounding second switch body 14 and opposing sleeve 30.

A tube 36, preferably glass or other ceramic material, is provided surrounding sleeve 30 and O-rings 32 and 34. Tube 36 is generally coaxial with sleeve 30 and coaxial with switch bodies 12 and 14. As indicated in the aforesaid U.S. patent application Ser. No. 300,205, O-rings 32 and 34 are selected to provide a liquid-tight seal between sleeve bodies 12 and 14, respectively, and tube 36, while accommodating relative axial and rotational movement of switch bodies 12 and 14.

As indicated in the aforesaid patent application, the use of an index matching fluid was anticipated. The fluid was to be retained by O-rings 32 and 34 to prevent back reflection. It is presently anticipated that the geometry of the present invention, as will be more fully described, may eliminate the need for such index matching fluids. This is a significant benefit since, in addition to the cost of the fluids, such fluids have a limited temperature range which may undesirably limit the usefulness of the switch 10.

A first packing gland 46 is provided surrounding free end 12", and a second packing gland 48 is provided surrounding free end 14". Packing glands 46 and 48 are bonded to switch bodies 12 and 14 through any suitable means. Packing glands 46, 48 are connected to first and second mounts 56, 60 by means of flexible diaphragms 50 and 52. Mount 56 may be physically connected to any stationary object, or may be connected to a handle. Mount 60 may be similarly connected. As a result, by rotating one mount (for example, mount 56) relative to the other mount (for example, mount 60), the switch bodies 12 and 14 (and hence, arrays 22, 22') are rotated relative to one another about axis X—X. This relative rotation results in switching of the optical fibers by selectively optically coupling and decoupling opposing fibers of the opposing arrays 22, 22'.

The diaphragms 50, 52 accommodate relative nonrotational movement between mounts 56, 60 and switch bodies 12, 14. As a result, strict coaxial alignment between switch bodies 12, 14 is maintained. It will be appreciated that any device for permitting movement in nonrotational directions may be substituted for any one or both of diaphragms 50, 52. For example, a bellows may be satisfactorily substituted.

B. Novel Geometry of the Fiber Arrays

As previously indicated, the optical switch 10 thus described is the subject of copending and commonly assigned U.S. patent application Ser. No. 300,205, except for the description and showing of the geometry of the terminal ends of the fibers of the arrays 22, 22'.

Reference is now directed to FIG. 4, which shows a cross-section of the switch 10 in the region of the opposing switch bodies 12 and 14. As a result of taking a cross section, only fibers 40, 42, and 40', 42' are shown. However, the reader will appreciate that the description of the invention with respect to these fibers is equally applicable to all fibers held in arrays 22, 22'.

Using fiber 42 as an example, FIG. 4 shows additional detail of the optical fibers. As shown in FIG. 4, and as is common in optical fibers, the fiber 42 includes a fiber core 42b surrounded by a fiber cladding 42c. The core 42b carries the optical signal transmission. Throughout this specification and the appended claims, when reference is made to the geometry of the optical fiber, it will be appreciated that the reference is meant to refer to the fiber core 42b with or without cladding 42c. (For ease of illustration, separation of fibers into cores and cladding is shown only in FIG. 4.)

As shown in FIG. 4, the arrays 22, 22' have been polished such that the terminal ends of the arrays 22, 22' are radiused with a radius of curvature R. The radius 22, 22' of curvature R is selected such that for all fibers which are not coaxial with axis X—X, the terminal ends of the fibers (such as end 42a of fiber 42) are set at a non-orthogonal angle A relative to the axis of the fiber (such as axis Y—Y). As a result of having the terminal end of the fiber 42a set at a non-orthogonal angle relative to the axis Y—Y of fiber 42, back reflection is reduced. It is generally anticipated that to avoid a back reflection loss of less than 40 dB, the angle A should preferably be greater than 2.5°. A preferred value for angle A is 5°.

As discussed, the terminal ends of the fibers need not be flat. Instead and more accurately, the angle A is measured between the tangent of the end surface of the fibers (when viewed in a longitudinal cross-section profile such as FIG. 4) at the fiber core and the axis of the fiber. Throughout this specification and the claims, reference will be made to the angles of the terminal ends of the fiber relative to the axis of the fibers. It will be appreciated that this is intended to mean the angle measured between the lesser included angle of the tangent at the fiber core and the fiber axis. As a result, the present invention can be practiced with terminal ends which are flat, partially spherical or any other shape.

The reader will note that the array 22 is provided with a concave polish, while array 22' is provided with a convex polish. Preferably, each of the arrays 22, 22' is provided with the identical radius of curvature R. As a result, opposing axially aligned fibers (such as fibers 42, 42') will have terminal faces 42a, 42a', which are set at complementary angles A, B, respectively, to the fibers' axes Y—Y (i.e. the angles A, B between the tangent and the core axis).

By complementary, it is meant that the lesser included angles A, B defined between the planes of terminal ends of the fiber cores and the fibers' axes Y—Y are generally equal for fibers 42, 42'. That is, angle A generally equals angle B.

The use of the term "generally equal" with respect to angles A and B means that angles A and B may differ slightly in amount but not so much as to impede upon the optical transmission between the opposing fibers. For practical purposes, angle A and B may differ by up to plus or minus 2°. As a result, if angle A is 5°, angle B may be anywhere between 3° and 7°. Throughout this specification and the claims, it is understood that use of the term "complimentary" means angles which are equal within the prescribed tolerance of not obstructing optical transmission.

While the terminal ends 42a, 42a' are polished with a radius, for practical purposes, the terminal ends of the fibers are generally flat in the region of cores 42b, 42b'.

The complementary angles result in refracted light exiting one fiber (fiber 42') to be redirected in a desired orientation when re-refracted through opposing fiber 42. It will be recognized by those skilled in the art having the benefits of the teachings of the present invention that back reflection is best avoided by maximizing the angles A, B. However, exceedingly large angles A, B will result in offset losses due to the refraction of light exiting a fiber becoming offset and out of alignment with the core of an opposing fiber. Accordingly, a 5° value for angles A, B together with a small separation between opposing fibers will suitably minimize back reflection, while avoiding significant offset losses due to refraction and longitudinal separation. To reduce longitudinal and fibers is held suitably small (for example, 0.01 mm).

FIG. 4 shows a preferred embodiment where the terminal ends of the arrays 22, 23 are provided with a partially spherical geometry of radius R. While such a geometry is preferred, it is not necessary to the practice of the present invention. All that is necessary is for the fibers to be offset from the axis of rotation X—X, and for the arrays 22, 22' to have a radially symmetrical geometry. By radial symmetry, it is meant that for all fibers equally spaced from axis X—X, the fibers are provided with a similar angle, such as angles A, B. Accordingly, when the fiber array is rotated in the switching operation, opposing fibers of opposing arrays 22, 22' always present complementary angles A, B.

C. Novel Polishing Technique

A novel method is provided for polishing the geometry on the ends of arrays 22, 22'. To appreciate and understand the novel method of manufacture, the reader's attention is now directed to FIGS. 5-9.

With best reference to FIG. 5, a jig 70 is shown having a base 72, a main body 74, and a pressure pad 76. Pressure pad 76 is cantilevered by an arm 78 to a support 80.

A generally horizontal slot 82 is formed through main body 74 separating body 74 into top portion 77 and bottom portion 79. A bore 84 is formed in body top portion 77 and is sized to receive a switch body, such as body 12 or 14, in close tolerance with bores 16, 18 vertically disposed. A cavity 88 is formed in body bottom portion 79. Cavity 88 is configured to receive a die, as will be described, and hold the die in coaxial alignment with a switch body disposed within bore 84.

With reference to FIG. 6, a first die 90 is provided for use with the jig 70 to polish a concave geometry on a fiber array. FIGS. 7 and 7A show a second die 92 for use with jig 70 to provide a convex geometry on an optical fiber array. Each of dies 90, 92 include a base 94, 96, which is sized to be received within an enlarged portion 88a of cavity 88. Each of dies 90, 92 further includes a support rod 97 axially extending from bodies 94 and sized to be received within narrow portion 88b of cavity 88.

Support rod 96 of die 90 terminates at a first reference surface 100, which is convex, and configured to be complementary to a desired concave geometry of an optical fiber array to be polished with use of die 90. Similarly, support rod 97 of die 92 terminates at a second reference surface 102, which is convex, and selected to be complementarily shaped to a desired concave geometry of a fiber optic array to be polished by die 92.

It is anticipated that dies 90, 92 will be used to shape the opposing arrays 22, 22'. In order that opposing arrays 22, 22' are complementarily shaped, reference surface 102 is preferably formed directly by reference surface 100. For example, where support rods 96 are both formed of steel (although they could be formed from other materials), reference surface 100 is first formed (for example, by affixing a ball bearing of desired radius to support rod 96). Support rod 96 of die 92 originally terminates at a flat axial face 93. The indent of second reference surface 102 is formed by inverting die 90 with rods 96, 97 vertical and axially aligned. Surface 100 is placed against flat face 93. Then, die 90 is impacted against die 92 to cause reference surface 100 to form complementary second reference surface 102. Also, surface 102 can be polished using die 90 and surface 100 as a reference surface.

Figure 8:
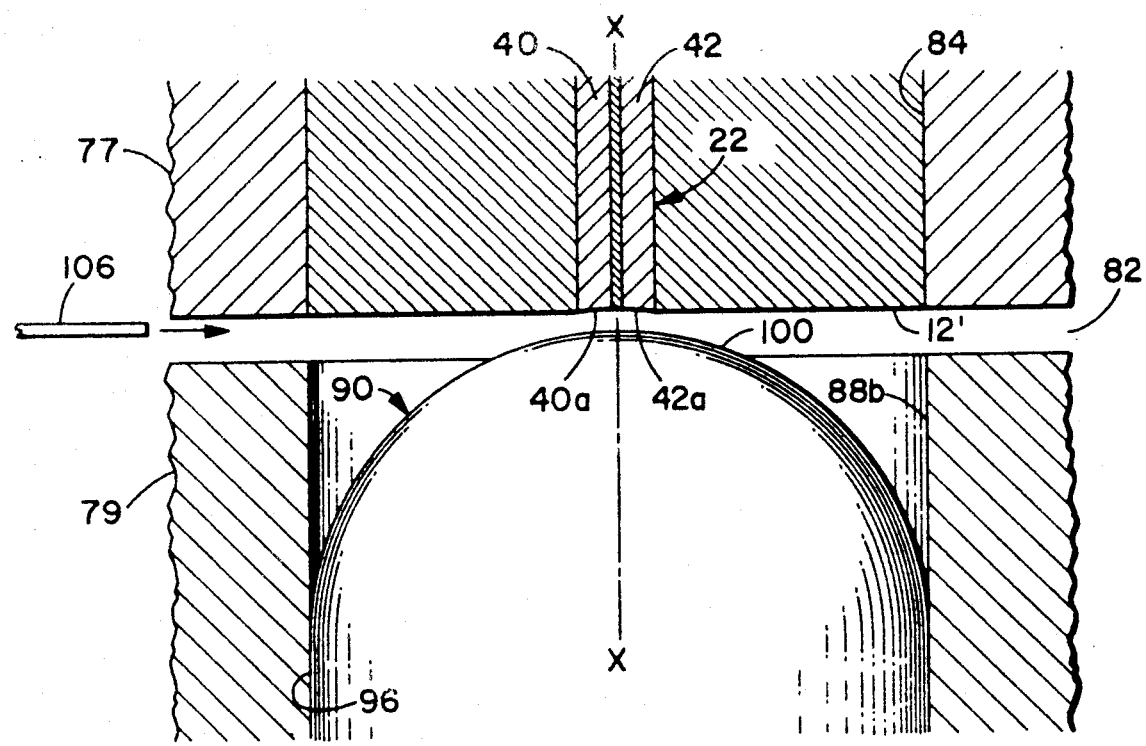
FIG. 8 is a side view, taken in section, showing an array of optical fibers being polished within the jig of FIG. 5, with use of the first die of FIG. 6.

FIG. 8 shows die 90 inserted within jig 70. As shown, reference surface 100 protrudes into slot 82. Body 12, containing fiber array 22 (of which fibers 40 and 42 are shown in FIG. 8) is placed within bore 84. Gravity will urge switch body 12 against reference surface 100. Alternatively, pressure pad 76 may be provided with sufficient weight such that pad 76 will urge against body 12 to force it against reference surface 100.

To shape the geometry of terminal ends of the fibers (such as terminal ends 40a, 42a), a polishing medium (such as a commercially available polishing film or paper 106 or a paste forced through slot 82) is inserted within slot 82 and disposed between body 12 and reference surface 100. Papers 106 which are extremely thin (e.g. less than 0.025 mm) and which will readily conform to the shape of surface 100 are commercially available. By an operator grasping polishing paper 106 and moving paper 106 in a relatively circular movement, the polishing medium 106 will polish the fiber array 22 such that the ends (e.g., ends 40a, 42a) will gradually conform to the shape of first reference surface 100. Polishing is continued until the array 22 is provided with a concave spherical geometry that is complementary to the convex spherical geometry of surface 100. Optical fibers, such as fibers 40, 42, are generally softer than the ceramic body 12. As a result, for practical purposes, there is little polishing of the body 12.

Figure 9:
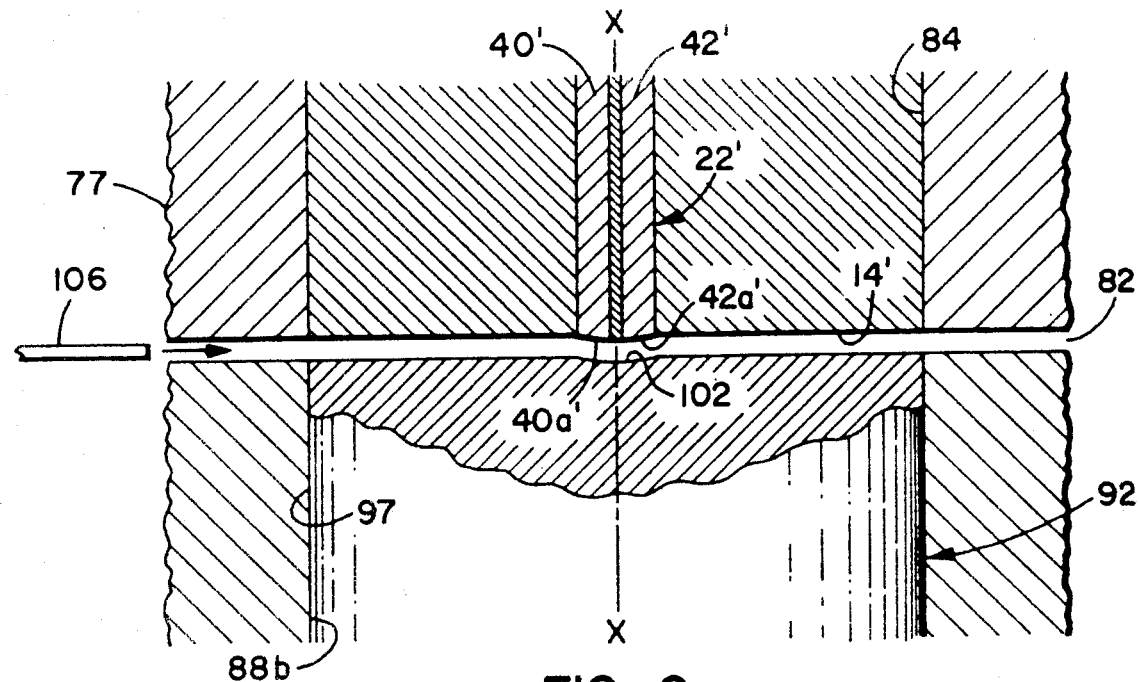
FIG. 9 is a view similar to FIG. 8 showing optical fibers being polished with use of the second die of FIG. 7, shown partially in section.

FIG. 9 shows the use of the jig 70 to form the concave geometry of array 22' with die 92. In the formation of array 22', the fibers 40'-43' are inserted into bore 18 so that they slightly protrude beyond surface 14'. By inserting the polishing paper 106 in a manner similar to that described in FIG. 8, the terminal ends (such as ends 40a', 42a') are polished to a convex spherical shape that is complementary to the concave spherical shape of second reference surface 102.

As noted above, polishing with surface 100 may be controlled to prevent polishing of body 12. As a consequence, the faces of 12' 14' of bodies 12, 14 are parallel and flat. The spacing S (FIG. 4) between the bodies 12, 14 may be maintained through any suitable means (such as by placement of a washer between the bodies 12, 14).

Figure 10:
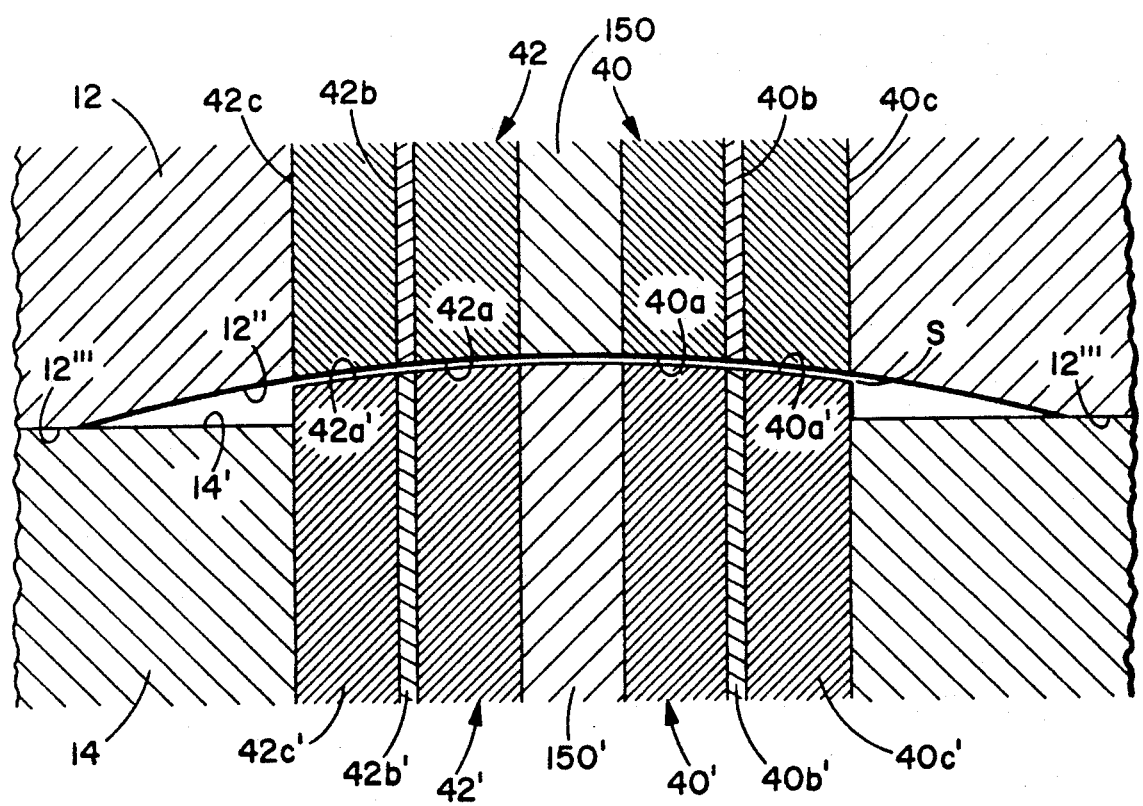
FIG. 10 is a cross-sectional view of opposing fiber arrays showing an alternative polishing of a switch body.

By permitting partial polishing of the body 12 with surface 100, an alternative spacing technique may be employed. With best reference to FIG. 10, the alternative spacing technique is shown. In FIG. 10, the same numbering scheme as FIG. 4 has been employed so that identical numbers are applied to identical elements. (In FIG. 10, numbers are applied to identical elements. (In FIG. 10, resin 150, 150' is shown as a filler).

In FIG. 10, the body 12 has been polished to present a concave surface 12". Since body 12 is only partially polished, the body 12 presents an angular ring area 12''' which is flat and parallel to face 14'. With the area 12''' abutting face 14', the concave surface 12" maintains the desired spacing S between the opposing fibers.

From the foregoing detailed description of the present invention, it has been shown how the object of the invention has been obtained in a preferred manner. In addition to reducing back reflection, the present invention may significantly reduce manufacturing costs and other complications associated with optical switch 10. For example, as previously indicated, the switch 10 may be used with or without an index matching fluid. Also, it is anticipated the switch 10 may be used with or without the addition of anti-reflective coatings on the optical fiber terminal ends.

Modifications and equivalents of the disclosed concepts such as readily occur to those skilled in the art are intended to be included within the scope of this invention. Thus, the scope of the invention is intended to be limited only by the scope of the claims as are, or may hereafter be, appended hereto.

What is claimed is:

1. An optical switch comprising:
   at least a first optical fiber and at least a second optical fiber;
   means for holding said first and second fibers in opposing relation, with each of said fibers spaced from an axis of rotation for said fibers to be rotatable relative to one another about said axis of rotation to selectively optically couple and decouple said opposing fibers;
   said first and second fibers terminating at non-planar first and second terminal ends, respectively; and
   said first terminal end set at a predetermined non-orthogonal angle relative to said axis of rotation; and
   said second terminal end set an an angle complementary to said predetermined non-orthogonal angle.

2. An optical switch according to claim 1 wherein said predetermined angle is a lesser included angle between an axis of said first fiber and a tangent of said first terminal and at said axis of said fiber.

3. An optical switch according to claim 1, wherein:
   said first optical fiber is one of a first plurality of optical fibers;
   said second optical fiber is one of a second plurality of optical fibers;
   first holding means for holding said first plurality in a first predetermined array;
   second holding means for holding said second plurality in a second predetermined array;
   aligning means for aligning said first and second arrays to rotate relative to one another about said axis of rotation;
   said first and second arrays selected for at least one fiber of each array to be disposed with an axis of said at least one fiber spaced from and generally parallel to said axis of rotation, and with a first terminal end of said at least one fiber opposing and optically coupled with a second terminal end of said at least one fiber of said second array when said first and second arrays are in a first relative rotational position about said axis of rotation, said at least one first and second fibers optically decoupled when said arrays are in a second relative rotational position;
   said first terminal end set at said predetermined non-orthogonal angle;
   said second terminal end set at said complementary angle.

4. An optical switch according to claim 3, wherein said arrays are polished with a radius of curvature, terminal ends of fibers of said first array presenting a convex geometry, and terminal ends of fibers of said second array presenting a concave geometry.

5. An optical switch according to claim 3, wherein said fibers of said first and second arrays are polished for said terminal ends of said fibers to present a lesser included angle of greater than 2.5° with an axis of said fibers.

6. An optical switch according to claim 5, wherein said angle is about 5°.

7. An optical switch according to claim 1 wherein said complimentary angle has a magnitude within two degrees of a magnitude of said predetermined non-orthogonal angle.

8. An optical switch comprising:
   a first plurality of optical fibers;
   a second plurality of optical fibers, fibers of said first and second plurality terminating at non-planar terminal ends;
   holding means for holding said first and second pluralities in first and second arrays, respectively, with said arrays rotatable relative to one another by rotation about a predetermined axis of rotation;

said terminal ends of fibers in said arrays configured for said fibers to present terminal ends which are set at a non-orthogonal angle relative to an axis of said fibers with said angle being other than 90°, said terminal ends cooperating to define an array surface and said array surfaces being radially symmetrical relative to said axis of rotation;

said surfaces of said first and second arrays selected to be complementary.

9. An optical switch according to claim 8 wherein said non-orthogonal angle is a lesser included angle between an axis of a fiber and a tangent of a terminal end of said fiber at said axis.

* * * * *